Aug. 6, 1935.  O. M. OLSEN  2,010,678
METER CONNECTING DEVICE
Filed April 5, 1934
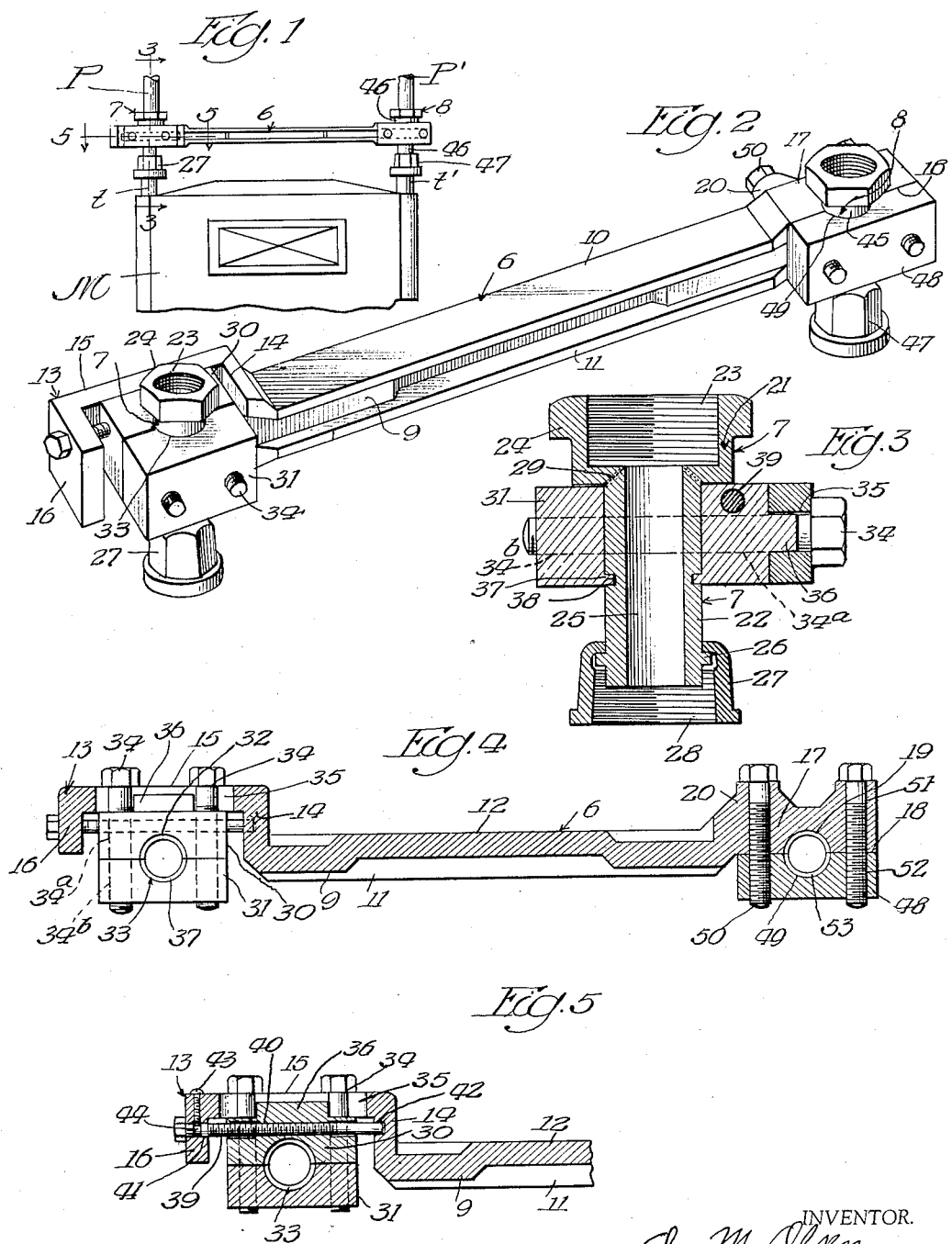
INVENTOR.
Ole M. Olsen
BY Fred Gerlach
his ATTORNEY.

Patented Aug. 6, 1935

2,010,678

UNITED STATES PATENT OFFICE 2,010,678

METER CONNECTING DEVICE

Ove M. Olsen, Rockford, Ill., assignor to Garnet W. McKee, Rockford, Ill.

Application April 5, 1934, Serial No. 719,118

11 Claims. (Cl. 285—3)

The present invention relates generally to devices for use in connecting meters to gas supply and service pipes. More particularly, the invention relates to that type of meter connecting device which consists of a rigid or non-adjustable, horizontally extending crossbar, a vertical coupling member which is associated with one end of the crossbar and is adapted to receive gas from the supply pipe to conduct the same into the meter and has a coupling ring at its lower end for attachment to the inlet tube of the meter, and a second coupling member which is associated with the other end of the crossbar, has a coupling ring at its lower end for connection to the outlet tube of the meter and is adapted to deliver gas from the meter to the service pipe.

In some constructions of meter connecting devices of this type, the coupling members are of the offset variety and are connected at the upper ends thereof to the gas supply and service pipes by means of vertical sleeves which are rotatably mounted in vertically extending, cylindrical sockets at the ends of the crossbar and have internal screw threads at their lower ends for connection to external threads on the upper ends of the coupling members and internal screw threads at their upper ends for connection to external screw threads on the gas pipes. Generally, the sleeves are formed of malleable iron castings and are provided with polygonal flanges at one end whereby they may be turned by a wrench or similar turning tool into connected relation with the gas pipes. Nuts at the other end of the sleeves or set screws in the ends of the crossbar are employed to lock the sleeves against rotation and axial displacement relatively to the sockets. In practice it has been found that sleeve type meter connection devices of this character are subject to several objections. In the first place, leakage of gas is likely to occur at the screw thread connections between the coupling members and the sleeves. Secondly, installation is protracted and sometimes difficult because of the use and the necessity for connection of two parts a coupling member and sleeve between each gas pipe and its associated meter tube. Thirdly, because of the screw thread connections between the coupling members and the sleeves, it is possible in connection with the installation of the device for the person in charge of installation operations to screw one of the coupling members further into its sleeve than the other member and thus bring one of the coupling rings nearer the crossbar than the other and cause upon completion of the installation a certain amount of strain upon the tubes of the meter.

One object of this invention is to provide a meter connecting device which comprises a rigid or one-piece crossbar and a pair of coupling members and is an improvement upon previously designed meter connecting devices of the same general character as far as mode and time of installation and leakage of gas are concerned, by reason of the fact that the upper ends of the coupling members are journaled directly in bearing means at the ends of the crossbar and are shaped and internally threaded for direct connection to the supply and service pipes. By so constructing the coupling members, installation of the device is facilitated because there is but a single part between each gas pipe and the associated inlet tube of the meter and there is but a minimum number of joints or screw thread connections in the assembly as a whole, with the result that there are less leaks than are encountered in meter connecting devices embodying sleeves.

Another advantage of arranging and constructing the coupling members in the aforementioned manner is that the lower ends of the coupling members are always disposed at a fixed and uniform distance from the crossbar and hence the coupling rings thereon are always in the same horizontal plane and cannot in any way distort or place under pressure the meter tubes after connection thereof to the tubes.

Another object of the invention is to provide a meter connecting device of the last mentioned character in which each of the coupling members has an enlarged, internally threaded, pipe-receiving upper end and an integral, ring-supporting flange at the lower end thereof, consists of upper and lower steel parts and is formed or fabricated by mounting the ring on the lower part and then joining the two parts permanently together by an electric butt weld.

Another object of the invention is to provide a meter connecting device of the type and character under consideration in which the inlet end of the horizontally extending crossbar, that is, the end which is associated with the coupling member for connecting the inlet tube of the meter to the gas supply pipe, embodies an integral, U-shaped part, and the coupling member for said inlet tube of the meter is connected to the U-shaped part by a pair of locking blocks between which it fits rotatably.

Still another object of the invention is to provide a meter connecting device of the last mentioned character in which the locking blocks for the coupling member for the inlet tube of the meter are arranged to slide in the U-shaped part of the crossbar so that the coupling member may be adjusted lengthwise of the crossbar, and to and from the coupling member for the outlet tube of the meter in order properly to space the coupling rings for attachment or connection to the meter tubes.

A further object of the invention is to provide a meter connecting device of the type and character last mentioned in which the locking blocks and the coupling member for the inlet tube of the meter embody novel coacting means for holding the member against longitudinal displacement with respect to the blocks, and novel means is provided for sliding the blocks for coupling member-adjustment purposes and locking the blocks in adjusted position.

A still further object of the invention is to provide a meter connecting device of the rigid or one-piece crossbar type in which the outlet end of the crossbar, that is, the end of the bar which is associated with the coupling member for the outlet tube of the meter, embodies an integral, enlarged part and a separately formed, bolt-supported, locking block, and this part and the block have oppositely facing, semi-cylindrical, vertically extending recesses in which the coupling member for the outlet tube of the meter fits.

An additional object of the invention is to provide a meter connecting device which is generally of new and improved construction, consists of but a small number of parts and may be manufactured at a low and reasonable cost.

Other objects of the invention and the various advantages and characteristics of the present meter connecting device will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a small scale side elevation of a meter connecting device embodying the invention;

Figure 2 is a perspective of the device;

Figure 3 is an enlarged vertical section taken on the line 3—3 of Figure 1 and showing in detail the manner in which the locking blocks for the coupling member at the inlet side of the device are connected to the U-shaped part of the crossbar so they are slidable longitudinally of the bar for coupling member-adjustment purposes;

Figure 4 is a horizontal section of the device illustrating in detail the manner in which the locking blocks serve to clamp in place the upper ends of the coupling members and to lock the latter against rotation; and Figure 5 is a horizontal section of the inlet end of the device taken on the line 5—5 of Figure 1 and disclosing in detail the means for adjusting longitudinally of the crossbar the locking blocks for the coupling member for the inlet tube of the meter.

The meter connecting device which forms the subject matter of the invention is adapted for use in connecting a gas meter M to a gas supply pipe P and a service pipe P'. The meter which is shown in Figure 1 of the drawing is of standard construction and embodies a vertically extending inlet tube $t$ at one side thereof and a vertical outlet tube $t'$ at its other side. The tubes $t$ and $t'$ are formed integrally with the meter casing and are provided at their upper ends with external screw threads.

The device comprises a one-piece, horizontally extending crossbar 6 and a pair of vertically extending coupling members 7 and 8. The coupling member 7 is associated with what may be termed the inlet end of the crossbar and is adapted as hereinafter described to connect the inlet tube $t$ of the meter M to the gas supply pipe P for the introduction or delivery of gas from the pipe to the meter. The coupling member 8 is associated with the other end of the crossbar, that is, the outlet end of the bar, and serves as a connection between the outlet tube of the meter and the service pipe P' and to conduct gas from the meter to the service pipe.

The crossbar 6 is formed of cast metal. The central part of the bar is somewhat similar to an I-beam or like structural element in cross section and consists of a vertical web 9, a top flange 10 and a bottom flange 11. The flanges project laterally from the sides of the web and operate to reinforce the crossbar horizontally. The central portion of the web 9 is offset relatively to the end portions, as best shown in Figures 2 and 4, in order to form a flat part 12 which is flush with the rear edges of the flanges 10 and 11 and is adapted to receive and form an attachment for a name plate (not shown). The inlet end of the crossbar is provided with an integral, U-shaped part 13. The latter consists of an inner end portion 14, a central or intermediate portion 15 and an outer end portion 16. The end portions 14 and 16 extend transversely of the crossbar and the central portion 15 extends lengthwise of the latter. The inner end portion 14 is formed integrally with the portions of the web 9 and the flanges 10 and 11 at the inlet end of the crossbar and is of slightly greater height than the central part of the bar. The other end of the crossbar, that is, the outlet end, embodies an integral, enlarged part 17. This part embodies a flat face 18 at the front thereof and a vertically extending, semi-cylindrical recess 19 for the upper end of the coupling member 8, and has at the rear part thereof a pair of laterally spaced, horizontally extending bosses 20.

The coupling member 7 consists of an upper part 21 and a lower part 22. These parts are preferably formed of steel and after being joined together as hereinafter specified, are cadmium plated or otherwise protected against rusting. The upper part 21 is cup-shaped and embodies an internal screw thread 23 for connection to the gas supply pipe P. A flange 24, hexagonal in shape, is formed on the upper end of the part 21 so that the coupling member 7 may be gripped by a wrench or similar turning tool and turned into connected relation with the pipe P. The lower part 22 of the coupling member is smaller than the upper part and has a longitudinal gas duct 25 therethrough. It is cylindrical and embodies at its lower end an integral, outwardly extending, annular flange 26 for supporting a coupling ring 27. The latter surrounds the lower end of the part 22 and embodies an internal screw thread 28 for connection to the internal screw thread on the upper end of the inlet tube $t$ of the meter M. The upper end of the part 22 is joined to the lower end of the part 21 by an electric butt weld 29. In forming or fabricating the coupling member 7, the coupling ring 27 is mounted on the part 22 and then the upper end of the part 22 is placed into abutting relation with the lower end of the part 21 and the two parts welded together electrically and to form a butt joint. When the two parts are welded together, the coupling member 7 is of one-piece or unit character and serves as a single instrumentality or element between the inlet tube of the meter and the supply pipe P. By forming the coupling member of steel and not as a malleable casting or two relatively rotatable parts, there is little, if any, likelihood of leakage of gas between the supply pipe P and the meter, and assembly or installation of the device is facilitated due to the fact that there are but two screw thread connections between the supply pipe and the inlet tube of the meter.

The coupling member 7 is normally held in connected relation with the U-shaped part 13 by means of a pair of metallic locking blocks 30 and 31. The block 30 fits between the inner and outer end portions 14 and 16 and against the inner face of the intermediate portion 15 of the U-shaped part 13, as shown in the drawing, and embodies in its outer side face a vertically extending, semi-cylindrical recess 32 for receiving the upper end of the lower part 21 of the coupling member 7. The block 31 is substantially the same in size as the locking block 30. It fits against the outer side face of the locking block 30 and embodies in its inner side face a vertically extending, semi-cylindrical recess 33. The latter is in the nature of a complement of, and is opposed to the recess 32, and the two recesses serve to confine the upper end of the part 21 of the coupling member 7. The locking blocks 30 and 31 are secured together and in clamped relation with the coupling member 7 so as to hold the latter against rotation in the recesses by means of a pair of bolts 34. The latter extend transversely and horizontally through smooth-bored holes 34ª in the end portions of the block 30 and internally threaded holes 34ᵇ in the end portions of the block 31. The head ends of the bolts extend through a longitudinal slot 35 in the central portion 15 of the U-shaped part 13. This slot is longer than the distance between the two bolts and permits the blocks, when the bolts are loosened, to slide longitudinally of the crossbar in order to effect adjustment of the coupling member 7 to or from the coupling member 8.

When the bolts 34 are loose, the coupling member 7 is free to rotate relatively to the blocks for pipe-connecting purposes or it may be shifted laterally with respect to the coupling member 8 for adjustment purposes. The recesses 32 and 33 have the same diameter as the part 21 of the coupling member 7 and are slightly less than semi-circular. As a result of this arrangement, the blocks clamp the coupling member 7 against rotation when the bolts 34 are tightened. The heads of the bolts bear against the outer face of the intermediate portion 15 of the U-shaped part 13 and serve when the bolts are tightened, to lock the blocks against sliding movement. In order to prevent tilting of the blocks 30 and 31 longitudinally of the crossbar, the block 30 is provided on the inner side face thereof with a lug 36. The latter is formed integrally with the block 30 and fits snugly and slidably in the slot 35. For the purpose of preventing axial displacement of the coupling member 7 with respect to the complemental, semi-cylindrical recesses, the lock blocks are provided at the bottom portion of these recesses with integral, inwardly extending, semi-circular ribs 37. These ribs fit within an annular groove 38 in the central portion of the lower part 21 of the coupling member 7.

In order to effect a sliding adjustment of the blocks 30 and 31 with respect to the U-shaped part 13, a screw 39 is provided. The shank of this screw extends through an internally threaded, longitudinal hole 40 in the locking block 30. The head end of the screw extends through a hole 41 in the outer end portion 16 of the U-shaped part 13 and the other end of the screw is smooth and fits within a socket 42 in the inner end portion 14 of the part 13. A set screw 43 is carried by the outer end portion 16 and is arranged so that the inner end thereof extends within an annular groove 44 in the portion of the shank of the screw 39 that is immediately adjacent to the head of the screw. This set screw serves to hold the screw 39 against axial displacement. When the bolts 34 are loosened so that the locking blocks 30 and 31 are free to slide relatively to the U-shaped part 13 for adjustment purposes, the desired adjustment may be effected by turning the screw 39. When this screw is turned in one direction, the locking blocks 30 and 31 are moved towards the inner end portion 14 of the U-shaped part 13 and thus the coupling member 7 is moved in the direction of the coupling member 8. Reverse rotation of the screw 39 serves to move the locking blocks in the opposite direction and so as to move the coupling member 7 away from the coupling member 8. The set screw 4 is preferably of such length that the inner end thereof rides loosely in the groove 44.

The coupling member 8 corresponds in size, shape and construction to the coupling member 7 and consists of an upper part 45 and a lower part 46. The upper part is cup-shaped like the upper part 21 of the coupling member 7 and is internally threaded for connection to the service pipe P'. The lower part is cylindrical and embodies at its lower end a coupling ring 47 for connection to the threaded upper end of the tube t' of the meter. The upper end of the part 46 is permanently united to the upper part 45 by an electric butt weld similarly to the upper and lower parts of the coupling member 7. The coupling member 8 fits within the semi-cylindrical recess 19 in the flat face 18 of the enlarged part 17 of the cross-bar 6 and is secured in place by means of a locking block 48. The latter embodies a complemental, semi-cylindrical recess 49 for the upper end of the lower part of the coupling member 8 and is held in clamped relation with respect to the latter by means of a pair of bolts 50. The latter are associated with the bosses 20 respectively and extend through smooth-bored holes 51 in the enlarged part 17 and internally threaded holes 52 in the locking block 48. The heads of these bolts bear against the outer ends of the bosses 20 and the bolts, when tightened, clamp the locking block 48 against the enlarged part 17 and thus lock the coupling member 8 in place and against rotation in the recesses 19 and 49. The part 17 and the locking block 48 have semi-circular, inwardly extending beads 53 at the lower ends of the recesses 19 and 49. These beads coact with an annular groove (not shown) in the central portion of the lower part 46 of the coupling member 8 to hold the member against vertical or axial displacement relatively to the crossbar.

The assembly of the device is as follows:

The bolts 34 and 50 are first loosened so as to release the coupling members 7 and 8 for rotation relatively to the bar. The coupling members are then rotated into connected rotation with the gas supply and service pipes P and P'. After connection of the coupling members to the pipes, the member 7 is adjusted relatively to the member 8 so as to space the coupling rings 27 and 47 the proper distance apart for reception of the upper threaded ends of the meter tubes t and t'. This adjustment is effected by turning the screw 39. After adjustment of the coupling member 7, the bolts 34 and 50 are tightened so as to lock the coupling members against rotation. Thereafter, the meter is raised so as to bring the meter tubes within the coupling rings and the latter are turned by a suitable turning tool so as to effect the desired connection of the tubes to the coupling member. If desired, the device may be assembled by removing the coupling members from the locking blocks and after connecting them to the gas supply and service pipes P and P', inserting them into place as far as the locking blocks are concerned. When the device is assembled as far as the meter and pipes P and P' are concerned, there is practically a direct connection between the pipes and the meter. By reason of the fact that there are but two connections between each meter tube and its associated gas pipe, leakage of gas is reduced to a minimum. Furthermore, assembly of the device is facilitated because there is but a single connecting instrumentality between each meter tube and its associated pipes. Another advantage of employing one-piece members between the meter tubes and the gas pipes is that the coupling rings for connection to the meter tubes are always disposed at a fixed and uniform distance with respect to the crossbar and in the same horizontal plane and hence when connected to the meter tubes they do not distort the tubes or place them under pressure tending to separate them from the sides of the meter.

The herein described meter connecting device may be manufactured at a low and reasonable cost by virtue of the fact that it consists of but a small number of parts and the latter lend themselves to ready machining and fabrication.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A device for use in connecting the tubes of a gas meter to a pair of gas pipes, comprising in combination a horizontal crossbar having bearing-forming means at each end thereof, a pair of vertically extending, one-piece, tubular coupling members having the upper ends thereof journalled respectively in the bearing forming means at the ends of the crossbar and provided with means rigidly and permanently united therewith for receiving a connection to the gas pipes and having the lower ends thereof extending downwardly from the crossbar and provided at a fixed distance from said crossbar with coupling rings for connection to the tubes of the meter, and means associated with said bearing forming means for holding the coupling members against axial displacement with respect to the latter.

2. A device for use in connecting the tubes of a gas meter to a pair of gas pipes, comprising in combination a horizontal crossbar having means associated with one end thereof for connecting one of the meter tubes to one of the gas pipes, a vertical coupling member at the other end of the crossbar having means at its lower end for connection to the other meter tube and a screw thread at its upper end for direct connection to the other gas pipe, and means for holding the coupling member in connected relation with said other end of the crossbar embodying a pair of side-by-side locking blocks having recesses in the opposed faces thereof adapted to receive the coupling member and to form a bearing whereby the latter is confined to rotate on a fixed vertical axis, and a bolt extending through the blocks and serving when tightened to clamp the latter together so as to lock the coupling member against rotation relatively thereto.

3. A device for use in connecting the tubes of a gas meter to a pair of gas pipes, comprising in combination a horizontal crossbar having means associated with one end thereof for connecting one of the meter tubes to one of the gas pipes, a vertical coupling member at the other end of the crossbar embodying a cylindrical portion and having a ring at its lower end for connection to the other meter tube and a screw thread at its upper end for direct connection to the other gas pipe, and means for holding the coupling member in connected relation with said other end of the crossbar comprising a pair of side-by-side locking blocks having complemental, semi-cylindrical recesses in the opposed faces thereof adapted to receive the cylindrical portion of the coupling member and to form a bearing whereby the latter is confined to rotate on a fixed vertical axis, and a bolt carried by said other end of the crossbar and arranged so that it extends through the blocks and serves when tightened to clamp the latter together so as to lock the coupling member against rotation relatively thereto.

4. A device for use in connecting the tubes of a gas meter to a pair of gas pipes, comprising in combination a horizontal crossbar having means associated with one end thereof for connecting one of the meter tubes to one of the gas pipes and having a U-shaped part at its other end, a vertical coupling member at said other end of the crossbar having means at its lower end for connection to the other meter tube and means at its upper end for connection to the other gas pipe, and means for holding the coupling member in connected relation with said other end of the crossbar comprising a pair of side-by-side locking blocks disposed in the U-shaped part of the crossbar and having recesses in the opposed faces thereof adapted to receive and form a bearing for the coupling member, and a clamp-bolt carried by said U-shaped part and extending through the blocks.

5. A device for use in connecting the tubes of a gas meter to a pair of gas pipes, comprising in combination a horizontal crossbar having means associated with one end thereof for connecting one of the meter tubes to one of the gas pipes and embodying at its other end a U-shaped part, a vertical coupling member at said other end of the crossbar having means at its lower end for connection to the other meter tube and means at its upper end for direct connection to the other gas pipe, and means in the U-shaped part of the crossbar forming a bearing for supporting the coupling member rotatably and mounted movably within said U-shaped part so that the member may be adjusted laterally and relatively to the crossbar.

6. A device for use in connecting the tubes of a gas meter to a pair of gas pipes, comprising in combination a horizontal crossbar having means associated with one end thereof for connecting one of the meter tubes to one of the gas pipes and embodying at its other end a U-shaped part, a vertical coupling member at said other end of the crossbar having means at its lower end for connection to the other meter tube and means at its upper end for direct connection to the other gas pipe, and a pair of side-by-side locking blocks in the U-shaped part of the crossbar having recesses in the opposed faces thereof for receiving the coupling member and movably connected to said U-shaped part of the crossbar so that the coupling member may be adjusted longitudinally of the bar.

7. A device for use in connecting the tubes of a gas meter to a pair of gas pipes, comprising in combination a horizontal crossbar having means associated at one end thereof for connecting one of the meter tubes to one of the gas pipes, a vertical coupling member at the other end of the crossbar having means at its lower end for connection to the other meter tube and means at its upper end for connection to the other gas pipe, bearing-forming means for supporting the coupling member movably connected to the other end of the crossbar so that the coupling member may be adjusted to or from the connecting means at said one end of the bar, and a manually manipulable device for positively moving the bearing-forming means for coupling member-adjusting purposes.

8. A device for use in connecting the tubes of a gas meter to a pair of gas pipes, comprising in combination a horizontal crossbar having means associated at one end thereof for connecting one of the meter tubes to one of the gas pipes, a vertical coupling member at the other end of the crossbar having means at its lower end for connection to the other meter tube and means at its upper end for connection to the other gas pipe, bearing-forming means for supporting the coupling member movably connected to the other end of the crossbar so that the coupling member may be adjusted to or from the connecting means at said one end of the bar, and a screw extending between said other end of the crossbar and the bearing-forming means and arranged so that when it is turned in one direction it serves to adjust the coupling member towards the connecting means and when rotated in the opposite direction it shifts the coupling member away from said connecting means.

9. A device for use in connecting the tubes of a gas meter to a pair of gas pipes, comprising in combination a horizontal crossbar having means associated with one end thereof for connecting one of the meter tubes to one of the gas pipes and embodying at its other end a U-shaped part having a longitudinal slot in its intermediate portion, a vertical coupling member at the other end of the crossbar having means at its lower end for connection to the other meter tube and means at its upper end for connection to the other gas pipe, a pair of side-by-side locking blocks in the U-shaped part having recesses in the opposed faces thereof for receiving the coupling member, and a pair of clamp-bolts extending through the blocks and having the head ends thereof mounted slidably in the slot.

10. A device for use in connecting the tubes of a gas meter to a pair of gas pipes, comprising in combination a horizontal crossbar having means associated with one end thereof for connecting one of the meter tubes to one of the gas pipes and embodying at its other end a U-shaped part having a longitudinal slot in its intermediate portion, a vertical coupling member at the other end of the crossbar and means for holding the coupling member in adjustable relation with said other end of the crossbar embodying a pair of side-by-side locking blocks having recesses in the opposed faces thereof for receiving the coupling member and a clamp-bolt extending through the blocks and the slot in said intermediate portion of the U-shaped part, and a lug affixed to one of the locking blocks and fitting slidably within said slot for holding the blocks against vertical tilting relatively to the crossbar.

11. A device for use in connecting the tubes of a gas meter to a pair of gas pipes, comprising in combination a horizontal crossbar having means associated with one end thereof for connecting one of the meter tubes to one of the gas pipes and embodying at its other end an integral, enlarged part having a bearing-forming recess in one of the side faces thereof, a locking block facing said one side of the enlarged part of the crossbar and having a complemental recess in its inner side face, a vertical coupling member fitting between the enlarged part and the locking block and in the recesses and provided at its lower end with means for connection to the other meter tube and at its upper end with means for connection to the other gas pipe, and a bolt extending through the enlarged part and the locking block and serving to clamp the block to said part so as to lock the coupling member against rotation in the recesses.

OVE M. OLSEN.